United States Patent

[11] 3,597,133

| [72] | Inventors | Josef Zeitvogel;<br>Siegfried Gehli, both of Radolfzell,<br>Germany |
|---|---|---|
| [21] | Appl. No. | 2,045 |
| [22] | Filed | Jan. 12, 1970 |
| [45] | Patented | Aug. 3, 1971 |
| [73] | Assignee | Allweiler AG<br>Radolfzell, Germany |
| [32] | Priority | Jan. 15, 1969 |
| [33] | | Germany |
| [31] | | P 19 01 759. |

[54] SCREW PUMP WITH THRUST ABSORBER
5 Claims, 1 Drawing Fig.

| [52] | U.S. Cl. | 418/203 |
|---|---|---|
| [51] | Int. Cl. | F01c 1/16 |
| [50] | Field of Search | 418/197,<br>201, 203 |

[56] References Cited
UNITED STATES PATENTS

| 1,218,602 | 3/1917 | Holdaway | 418/203 |
|---|---|---|---|
| 1,698,802 | 1/1929 | Montelius | 418/203 |
| 1,751,703 | 3/1930 | Long | 418/201 X |
| 2,095,167 | 10/1937 | Burghauser | 418/197 |
| 2,588,888 | 3/1952 | Sennet | 418/201 X |
| 2,693,762 | 11/1954 | Sennet | 418/197 |
| 3,275,226 | 9/1966 | Whitfield | 418/203 |

*Primary Examiner*—Carlton R. Croyle
*Assistant Examiner*—Wilbur J. Goodlin
*Attorney*—Edward E. Sachs ABSTRACT: A screw pump having a driving rotor and two driven idler screws, each of which is composed of helical passages which are disposed in intermeshing relationship. Within the suction chamber a collar is mounted upon each driven screw for bearing contact relationship with the housing and simultaneously for interposition between the driving rotor and the housing to counteract or absorb the axial thrust developed by the driven screws and the rotor.

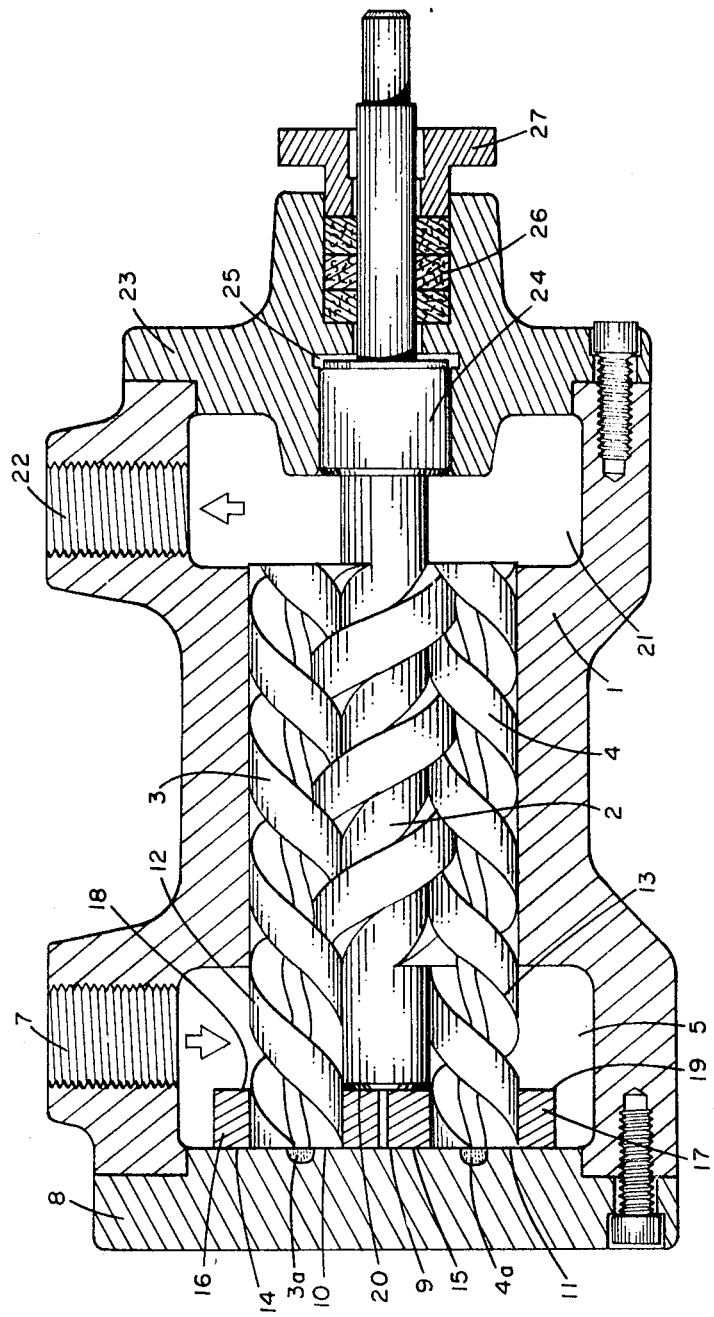

SCREW PUMP WITH THRUST ABSORBER

The invention relates generally to a screw pump and, more particularly, to an improvement in screw pumps having a driving rotor and two driven idler screws.

The thrust upon the helical surface of screws used in so-called "screw pumps" arises from the helical passages through which the driving torque is transferred from the driving rotor to the driven idler screws. Whereas the thrust of the driving rotor is directed towards the suction end of the pump, the thrust of the driven screws is generated and acts towards the pressure end, i.e. in the opposite direction. Thus, when the pump is called upon to deliver fluid, at a low pressure, a situation may arise in which the thrust of the helix of the screws is greater than the axial thrust that is developed by the hydraulic fluid. In such a case, if no precautions are taken, the driven idler screws are forced into the pressure chamber. Also, care must be taken that the thrust developed by the driving rotor is counteracted or absorbed.

In the prior art to which this invention pertains, the pumps are designed in such a manner that the driving rotor, like the driven idler screws, are allowed to rotate against an end face on a fixed portion of the housing, at the suction end of the pump. Such a design is, however, disadvantageous in that the diameter of the driven idler screws abutting the surface at the suction end, which has to absorb the axial hydraulic thrust, cannot be made substantially larger than the outside diameter of the helical profile of the screws. Since loadability of the pump is governed by the diameter of the profile, the pumps can be used only for relatively low fluid pressure applications.

In another design of the prior art, the thrust of the helical profile of the driving rotor is absorbed by a ball bearing located at the driving end of the pump. In comparison to the designs mentioned above, such a construction has the advantage in that the surface at the suction end abutting the driven idler screw may be enlarged by means of a flange or the like and thereby the pump may be constructed and utilized for use at higher fluid operating pressures. The disadvantage of such a design is, however, that the pump becomes too complex and therefore uneconomical to manufacture, particularly since close tolerances must be adhered to.

In order to overcome these difficulties, attempts have also been made to provide the driving rotor with a collar at the pressurized end of the pump. The diameter of such a collar is such that the same wholly or partly covers the end faces of the driven idler screws. The collar transfers the forces from the helical passages of the driving rotor to the driven screws and, at the same time, prevents the driven rotor from moving towards the pressure chamber in the event of low-pressure fluid condition. A pump construction of that type has considerable production drawbacks inasmuch as the collar must be made integral with the driving shaft and this in turn requires special tooling operations which are not even overcome by shrink fitting the collar into place. Because the latter results in an increase in machining cost the collar must be reground after being placed into position. Moreover, accurate fits such as those required for shrink-fitting parts are costly to produce and for satisfactory operation it is usually required that the collar be hardened.

Inasmuch as the pump of the type herein under consideration is of the type that is usually mass produced in order to achieve a relatively low price, it has been found that the above approaches are unsatisfactory and economically unsuitable.

It is therefore the primary object of this invention to eliminate the disadvantages and difficulties of the prior art devices and to provide an improved screw pump having a simple and inexpensive means for absorbing the axial thrust of the rotor and the idler screws.

An aspect of the present invention resides in the provision of a screw pump which includes a housing defining a suction chamber and a pressure chamber. The housing receives a driving rotor and driven idler members of a screwlike nature, which are rotatably disposed in intermeshing relationship within the housing and, more particularly, extend to and between the suction and pressure chambers. An annular collar is mounted on each driven member, within the area of the suction chamber and substantially at the axial end of the driven member, the collar is interposed between the axial end of the driving rotor and the housing to establish bearing contact relationship with the driving rotor and effective to counter the axial thrust developed by the driven members at the suction end of the pump.

For a better understanding of the present invention, together with other and further objects thereof, reference is had to the following description taken in connection with the accompanying drawings, and its scope will be pointed out in the appended claims.

In the drawings:

The single FIGURE illustrates a pump, in longitudinal cross section, in accordance with this invention.

Referring now to the drawing, the pump is composed of a housing 1 adapted for receiving, with a narrow tolerance, a set of rotatable members comprising a centrally located driving rotor 2 and two orbitally disposed driven idler screws 3 and 4. Each of the rotatable members 2, 3 and 4 are provided with helical profiles. The helical profiles 12 and 13 of idler screws 3 and 4 are in meshing engagement with the complementary helical profile of the driving rotor 2. While the driving rotor extends into the pump and a short extension is provided for connecting the rotor 2 to a motor or the like, (not shown), the idler screws are discontinuous in that they are wholly contained within the housing 1.

For purposes of reference, the power input end of the pump will be referred to as the forward end, whereas the opposite end of the pump will be referred to as the rear end.

Proximate to the rear portion of the rotor 2 and screws 3 and 4, the housing is formed so as to provide a suction chamber 5 which has a fluid connection with a fluid inlet 7 provided within the walls of the housing. The rear end of the housing 1 is closed by means of a cover 8 which thereby defines one surface of the suction chamber 5. The rear housing cover 8 is formed with lubricating cavities 3a and 4a adjacent to idler screws 3 and 4, respectively. The helical profile 12 and 13 of idler screws 3 and 4, respectively, form axial end faces 10 and 11, respectively, located within the suction chamber and bear against the inside face of cover 8. The profiles 12 and 13 are adapted to each receive with a press fit a collar 16, 17 which have axial end faces 14, 15 which are also disposed in bearing relationship to the cover 8. The outside diameter of each collar is substantially twice the distance between the centers of the driven idler screws and the driving rotor.

The forwardly facing surfaces 18, 19 of the collars 16, 17 respectively, serve as a bearing surface for the axial rear end face 20 of the driven rotor 2, at the suction end and within the suction chamber 5 of the pump and thus are interposed between the housing cover 8 and the end face 20 of rotor 2.

At the forward end of the pump at a point where the idler screws 3 and 4 terminate, the housing provides a pressure chamber 21 and a fluid outlet 22 which is connected to the pressure chamber 21. The forward portion of the housing is closed by means of a cover 23 which fits closely over the rotor 2 to rotatably receive and mount the same. In order to facilitate a proper seating arrangement the shaft is provided with a radially enlarged shoulder 24. The shoulder 24 is dimensioned in such a manner so as to obtain equalization of the axial hydraulic thrust generated within the pump. The forward axial face of the shoulder 24 is spaced relative to the forward end cover 23 so as to establish a chamber 25 which is connected to suction chamber 5 by means of a fluid conduit, not shown.

In order to establish and maintain fluidtight integrity the forward end cover 23 receives a plurality of packing seals 26 which sealingly surround the rotor 2. The seals 26 are preloaded by means of a nut 27 which is secured to the end cover 23 and in axial engagement with the seals, by screws or other means, not shown.

By intermeshing the idler screws 3, 4 and rotor 2, the helical passages in the rotors are divided into compartments which are thus completely sealed, and which, while rotating, progress from the suction chamber to the pressure chamber or discharge end to deliver fluid.

In view of the foregoing description, it will be appreciated by those skilled in the art that the arrangement in accordance with the invention facilitates that the forces established on the helical surfaces of the rotating members 2, 3 and 4, are absorbed at the suction end of the pump by the collars 16 and 17. Thus, the axial thrust developed by the idler screws—which is normally relieved at the pressure end—is absorbed or counterbalanced by the axial thrust of the driving rotor whose axial thrust is normally in a direction opposite to that of the idler screws.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What we claim is:

1. A screw pump comprising in combination: housing means defining a suction chamber and a pressure chamber;
   driven and driving means of a screwlike nature in intermeshing relationship rotatably disposed within said housing means and extending into the suction chamber;
   an annular collar mounted on said driven means within the area of the suction chamber and substantially at the axial end of the driven means, and interposed between the axial end of the driving means and the housing means for bearing contact relationship with the driving means.

2. A screw pump according to claim 1, wherein said axial end of the driven means is adapted for bearing contact with said housing means.

3. A screw pump according to claim 2, wherein the outside diameter of said collar exceeds the outside diameter of the helically profiled driven means.

4. A screw pump according to claim 1, wherein said collar is rigidly secured to said driven means.

5. A screw pump according to claim 1, wherein said driving means and said driven means comprises a driving rotor and two driven idler screws, respectively, and the outside diameter of said collar approximates twice the distance between the centers of the driven screws and the driving rotor.